US007219558B1

(12) United States Patent
Bowman et al.

(10) Patent No.: US 7,219,558 B1
(45) Date of Patent: May 22, 2007

(54) ULTRA LOW PRESSURE DROP FLOW ELEMENT SYSTEM FOR MEASURING FLUID FLOW RATES

(75) Inventors: John Lloyd Bowman, Tucson, AZ (US); Ross Justin Snider, Tucson, AZ (US)

(73) Assignee: Bowman Industry & Manufacturing LLC, Tucson, AZ (US)

( * ) Notice: Subject to any disclaimer, the term of this patent is extended or adjusted under 35 U.S.C. 154(b) by 0 days.

(21) Appl. No.: 11/590,983

(22) Filed: Nov. 2, 2006

(51) Int. Cl.
*G01F 1/37* (2006.01)
(52) U.S. Cl. .................................. 73/861.52
(58) Field of Classification Search ............ 73/861.52, 73/861.63, 861.42, 861.47, 861.55
See application file for complete search history.

(56) References Cited

U.S. PATENT DOCUMENTS 4,905,709 A * 3/1990 Bieganski et al. .......... 600/538
6,865,957 B1 * 3/2005 Hughes et al. ........... 73/861.52
7,047,822 B2 * 5/2006 Good et al. .............. 73/861.52

* cited by examiner

*Primary Examiner*—Jewel Thompson
(74) *Attorney, Agent, or Firm*—J. Marc Edwards (57) ABSTRACT

The present invention relates to the field of correlating a fluid flow rate by strategically measuring a differential pressure of a fluid. Embodiments of the present invention build off a simple concept of applying an aerodynamic device into a flow stream in conjunction with a flow concentrator and measuring fluid pressure at two locations on the aerodynamic device. The flow meter has not moving parts other than used for making tuning adjustments in some embodiments. A central design approach with the present invention is that each component can be adjusted relative to the other. Unlike prior systems that utilize a necked-down region of a fluid passage, the current system increases fluid velocities around a centralized flow element with the aid of an aerodynamic flow horn. Head losses are minimized through this approach. Additionally, having adjustability between the components will allow one to tune the flow meter to a preferred head loss and preferred pressure differentials by allowing the flow element to concentrically translate within its respective flow horn.

12 Claims, 11 Drawing Sheets

ULTRA LOW PRESSURE DROP FLOW ELEMENT SYSTEM FOR MEASURING FLUID FLOW RATES

CROSS REFERENCE TO RELATED APPLICATIONS

Not applicable.

FEDERALLY SPONSORED RESEARCH

Not applicable.

REFERENCE TO A MICROFICHE APPENDIX

Not applicable.

FIELD OF THE INVENTION

The present invention relates to the field of correlating a fluid flow rate by strategically measuring a differential pressure of a fluid.

BACKGROUND OF THE INVENTION

The commercial value of a flow meter is dependent upon its ability to provide strong, clear signals which, for ease of use, are linearly related to fluid parameter signals, to be applicable to a variety of fluids each possessing unique viscosities and be usable over a large range of flow rates. There is, however, a tendency for such devices to produce signals which are not consistently measurable, thus causing signaling devices of lesser accuracy than desired. Many flow meters in a similar classification rely on the principles of Bernoulli's Equation, thus (usually) relating fluid velocities to fluid pressures. A drawback to existing differential pressure measuring flow meter systems is that the entire flow stream is typically necked-down into a reduced flow area thus causing flow rates for all the fluid to increase and therefore, fluid pressures to drop, thus causing a potentially undesirable head loss on the system.

Bernoulli's Equation: $\Delta P = \rho v^2/2$ Where P is the pressure of the fluid, p is fluid density, and v is the fluid velocity. This allows one to use the effects of an aerodynamic wing in which the speed of the air moving over the top face of a wing causes a lower pressure, creating lift. Conversely, slowing the speed of air moving under the lower face of a wing causes a higher pressure, creating elevated pressure, thus lift. This also allows one to create a higher $\Delta P$ from the flow element but have a lower $\Delta P$ through the entire flow measuring system.

Poiseuille's Equation: $Q = (\pi r^2/8\eta L)\Delta P$ Where Q is the flow rate, R is the radius of restriction, n is the fluid viscosity, L is the length of the restriction, and P is the pressure of the fluid. This allows one to minimize the effects of drag and viscosity by elongating the flow passage to reduce turbulence.

OBJECTS AND ADVANTAGES

Accordingly, several objects and advantages of the present invention will be presented in the following paragraphs followed by a thorough disclosure of each aspect in the accompanying embodiments in the DETAILED DESCRIPTION.

In light of the above-mentioned problems, it is therefore an object of the present invention to provide a device capable of creating minimal fluid turbulence;

Further, it is another object of the present invention to allow for high flow rates through the system with minimal head loss;

It is an object of the present invention to re-direct fluid flow to gain a differential pressure signal;

It is an object of the present invention to collectively measure a pressure differential at two or more locations of a flow element to determine fluid flow rates;

It is an object of the present invention to maintain a venturi effect while allowing adjustability of a flow element within its counterpart flow horn;

Another object of the current invention is to provide a robust design capable of field service;

It is another object of the present invention to provide means for minimal pressure drops at high or low flow rates as a fluid passes through the system;

Another object of the invention is to allow for high flow rates with high pressure drops as fluid passes through the system;

Another object of the present invention is to provide means for mechanical adjustments within the system to allow tuning for optimizing data collection;

Additionally, another object of the present invention is to provide means for mechanical adjustments within the system to allow tuning for optimizing flow rates;

It is another object of the present invention to provide an affordable concept that is not prohibitively expensive to manufacture and use and even be disposable;

Additionally, an object of the present invention is to wirelessly transmit data from within a flow stream to an external receiver;

Another object of the present invention is to wirelessly induce excitation upon a flow element within a flow stream;

Yet another object of the present invention is to simplify predicted flow profiles through mathematically comparing two flow profiles, thus allowing one to maintain a venturi effect, dropping pressure and increasing fluid velocity, as fluid passes through the system;

Yet, according to some embodiments, another object of the present invention is to provide a flow element capable of holding up to harsh fluid environments;

An additional object of the present invention is to provide means for a magnetically coupled flow element to external induction coil, thus requiring no mechanical fastening to maintain position of the flow element in a fluid stream;

Another object of the present invention is to incorporate useful analog to digital conversion of data from within the flow element;

A further object of the invention is the ability to manufacture with sterilizable materials;

A further object of the present invention is to provide an internal press-fit between a flow element and a flow body, thus requiring no fasteners to mate the assembly;

Additional objects of the invention are to utilize a flow element system in ducts not having a round internal flow path;

Further objects and advantages will become apparent in the following paragraphs. Solely and in combination, the above objects and advantages will be illustrated in the exemplary figures and accompanying embodiments to follow.

SUMMARY OF THE INVENTION

Embodiments of the present invention build off a simple concept of applying an aerodynamic device into a flow stream in conjunction with a flow concentrator and measuring fluid pressure at two locations on the aerodynamic device. The flow meter has not moving parts other than used for making tuning adjustments in some embodiments. The core idea is to take advantage of solid-state pressure sensor technology which user very low power thus suitable for battery operation used in physical conjunction with a flow element of high strength material, preferably molded from plastic. The measurement principle utilizes a differential pressure transducer to measure pressure differentials across an accelerated flow profile of a flow element subjected to a flow profile. Applying pressure relationships to flow rate is a well-understood and fundamentally sound technique to determine velocity and thus a relation to flow rate.

Industrial and consumer electronics have afforded us all of quality and high production components embodied in the device. The software is specific to the application and the metrology calibration and acquisition of flow data. The combination of high-resolution pressure sensor signal in a low-pressure application, a commercial but powerful microcontroller and application specific software gain the accuracy needed at commercial costs.

The linear flow element has two distinct advantages: First, it becomes a structure and strength support flow-through member and second, its length can be determined and fixed to straighten flow.

A central design approach with the present invention is that each component can be adjusted relative to the other. Unlike prior systems that utilize a necked-down region of a fluid passage, the current system increases fluid velocities around a centralized flow element with the aid of an aerodynamic flow horn. Head losses are minimized through this approach. Additionally, having adjustability between the components will allow one to tune the flow meter to a preferred head loss and preferred pressure differentials by allowing the flow element to concentrically translate within its respective flow horn as will be discussed below.

The centralized flow element has the advantage of damping pulsations through its aerodynamic frontal profile and annular flow path, to minimize system turbulence and provide more consistent data collection.

The current invention teaches differential pressure pickups located on the centralized flow element rather than on a flow stream wall. Similar to a pitot tube, the flow element harnesses strategic geometry to maximize the differential pressure effects in line with Bernoulli's equation. As well, adjustability of the flow element within its central flow horn allows one to tune fluid flow through the system to optimize the benefits of Poiseuille's Equation by reducing overall turbulence through the system. The benefits of the present invention utilize higher differential pressure measurement within a defined measurement area that allows for increased measurement accuracy of fluid flow rate as well as minimizing pressure drop in the overall system compared to previous systems.

BRIEF DESCRIPTION OF THE DRAWINGS

The figures are exemplary of different embodiments of the present invention. Each illustration conveys the invention and is not to be considered as limiting, rather, exemplary to the scope and spirit of the present invention. One having ordinary skill in the art could perceivably modify or combine the exemplary embodiments without taking from the spirit of this innovation. Like components in the figures share identical numbering.

DETAILED DESCRIPTION

The following paragraphs will detail, at minimum, the best mode of the present invention. The exemplary figures and description of the invention as it is exemplified in each illustration is representative of the current invention and the scope of the invention disclosure is not intended to be limited by the exemplary teachings. One skilled in the pertinent art will readily recognize the possible variations and combinations of the embodiments that follow as this is intended to be within the scope of the taught flow element system for measuring fluid flow rates. Like physical structure in different figures share the same identifying numbers.

Advantages and disadvantages of utilizing differential pressure readings to determine a flow rate were discussed in the BACKGROUND OF THE INVENTION and SUMMARY OF THE INVENTION help establish attempts by others who have also realized the problems that the current invention is overcoming.

Figure 1:
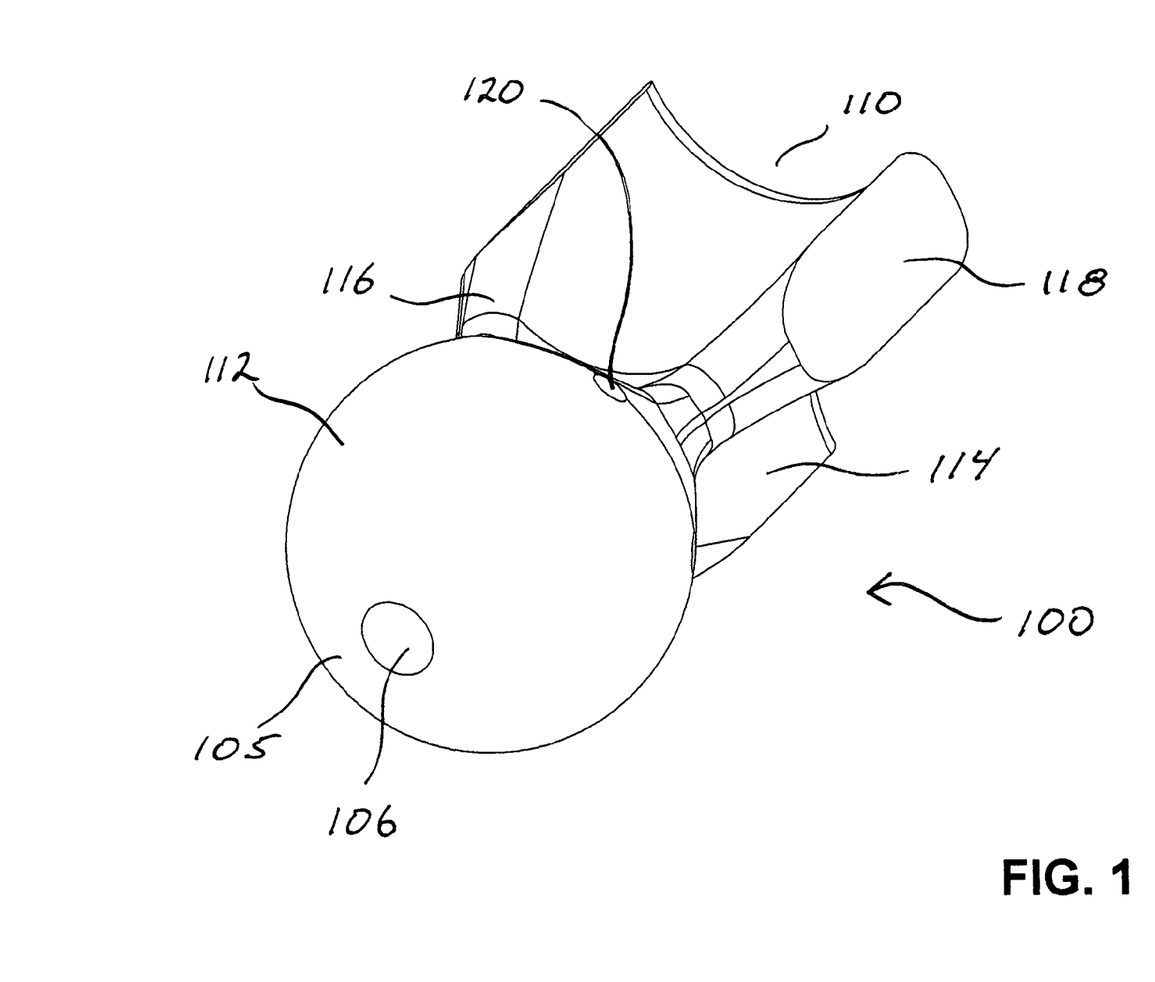
FIG. 1 illustrates an isometric frontal view of a flow element in accordance with an embodiment of the present invention.

FIG. 1 illustrates an isometric frontal view of a flow element 100 in accordance with an embodiment of the present invention. Flow element 100 can be made from a molding process in order to maintain part consistency and low manufacturing costs or manufactured from other processes if materials and/or size constraints require. Additionally, flow element 100 can be made from a metal, Teflon, glass-filled nylon, nylon, glass, etc. depending on the fluid that will come into contact with the element. Flow element 100 comprises a leading flow surface 105 and a trailing flow surface 110 (visibility of trailing flow surface 110 will be shown more clearly in following FIGS.). Leading flow surface 105 is illustrated as a spherical profile 112, yet other aerodynamic flow leading-edge profiles are intended to be embodied in the invention such as elliptical or conical profiles. A static pressure tap 106 is concentrically located about aerodynamic leading flow surface 105. P1 static pressure tap 106 is herein defined to acquire a P1 static pressure when subjected to fluid flow. Barely visible in FIG. 1 is a P2 pressure tap 120. Embodied are one or more P2 pressure taps as will become evident in FIGS. to follow. Located aft of spherical profile 112 is a necked-down region 116 that aerodynamically transitions into three symmetric fins 114, each terminating at their outermost surface by a radiused surface 118. Radiused surface 118 substantially matches the radius profile of spherical profile 112.

Figure 2:
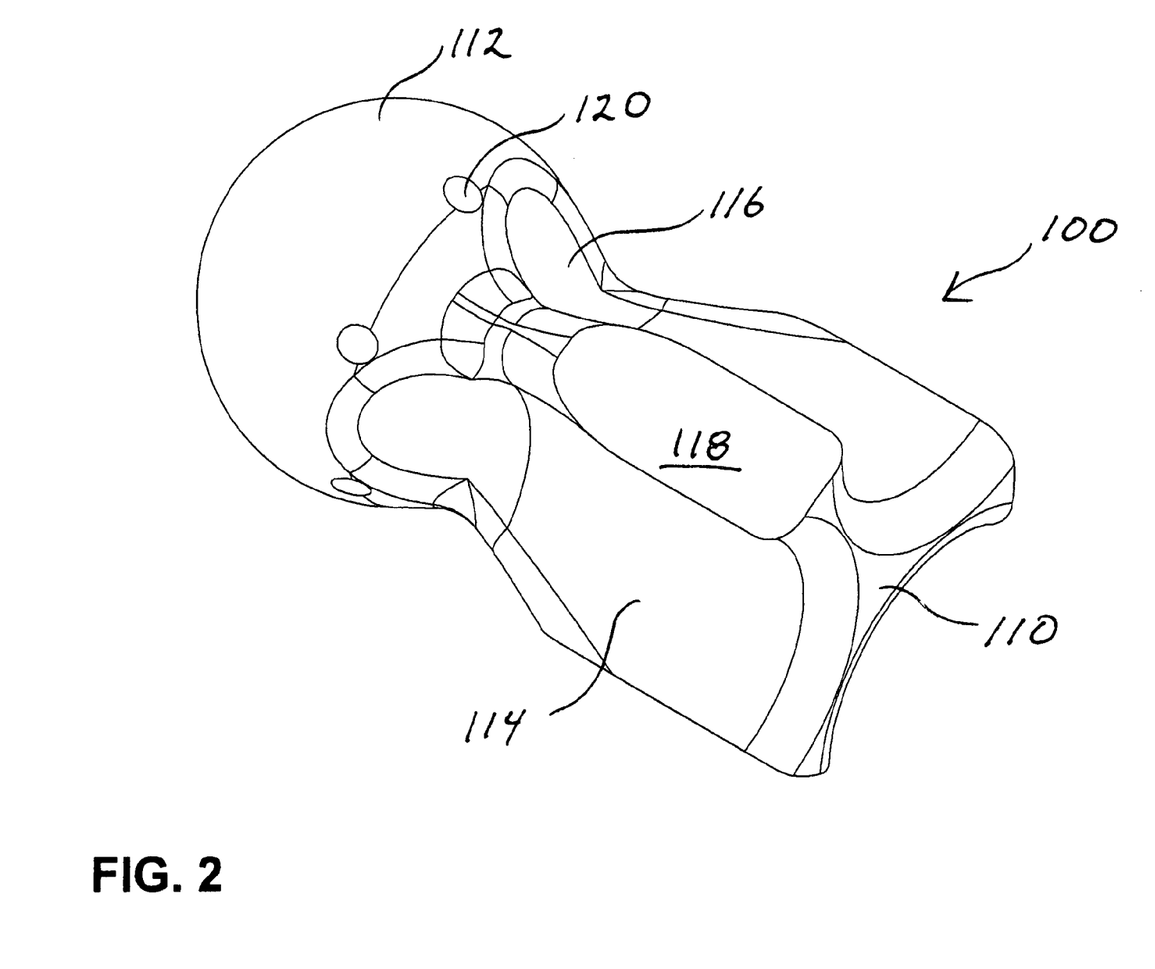
FIG. 2 illustrates an isometric back view of the flow element from FIG. 1.

FIG. 2 illustrates an isometric back view of flow element 100 in accordance with an embodiment of the present invention. Clearly visible in FIG. 2 are a plurality of P2 pressure taps 120, each tap joining to a common fluid connection within flow element 100 (following FIGS. will detail internal fluid connections). Necked-down region 116 is embodied with a concaved portion on the trailing edge of spherical profile 112 between each symmetric fin 114. Other similar, smooth-transitioning, necked-down region profiles are also intended to be within the scope of these embodiments.

Figure 3:
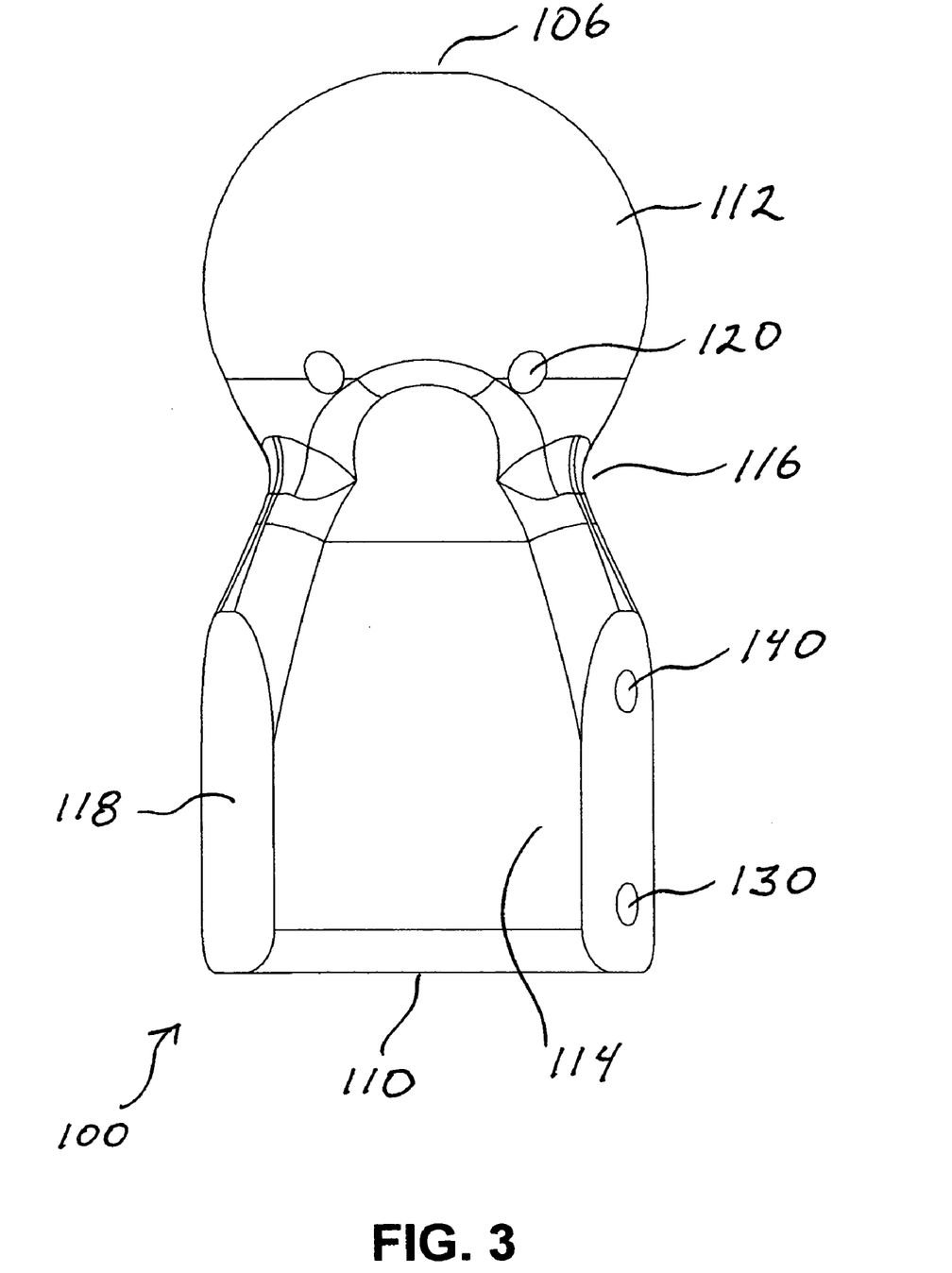
FIG. 3 illustrates a side view of the flow element introduced in FIG. 1.

FIG. 3 illustrates a side view of flow element 100, in accordance with an embodiment of the present invention. P1 static pressure tap 106 conduits with a fluid connection to a P1 static pressure pickup 130. Plurality of P2 pressure taps 120 conduits with a fluid connection to a P2 pressure pickup 140. In this embodiment, P1 static pressure pickup 130 and P2 pressure pickup 140 will fluidly connect to a differential pressure transducer. The measurement principle is to measure a differential pressure across a flow profile, a well understood and fundamentally sound technique to determine velocity, thus a flow rate relationship as fluid passes over flow element 100.

Figure 4:
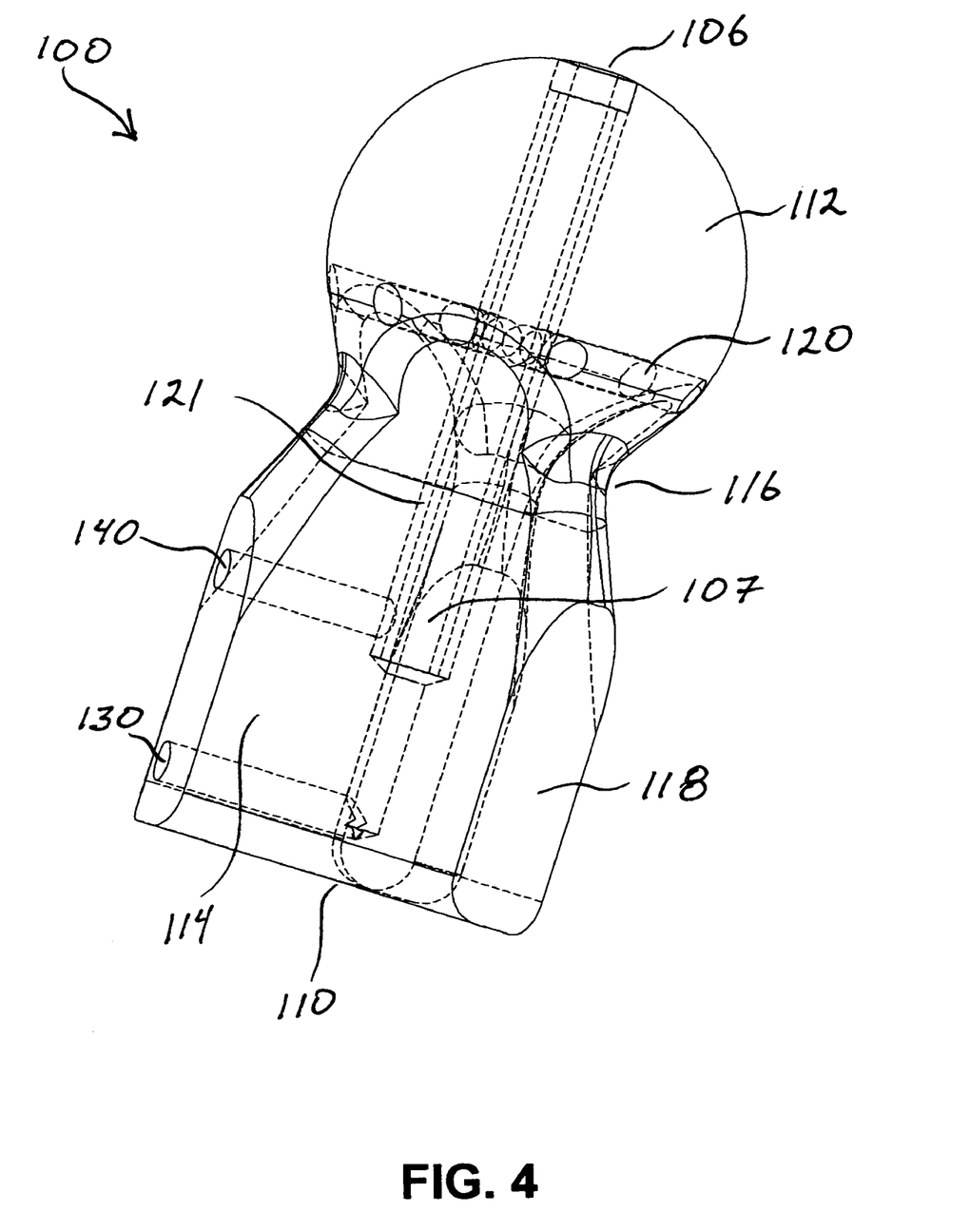
FIG. 4 illustrates a side view of the flow element introduced in FIG. 1 having hidden lines visible.

FIG. 4 illustrates a side view of flow element 100 having all hidden lines visible. P1 static pressure tap 106 fluidly conduits to P1 static pressure pickup 130 via a P1 duct 107. Plurality of P2 pressure taps 120 fluidly conduit to P2 pressure pickup 140 via a P2 duct 121. The preferred embodiment utilizes a symmetrical order of P2 pressure taps 120 substantially radially oriented about a trailing location of spherical profile 112 in an effort to better average P2 readings to common P2 duct 121. Although no differential pressure transducer is illustrated, P1 static pressure pickup 130 and P2 pressure pickup 140 fluidly connect outside of flow element 100 as will be expressed in coming FIGS.

Figure 5:
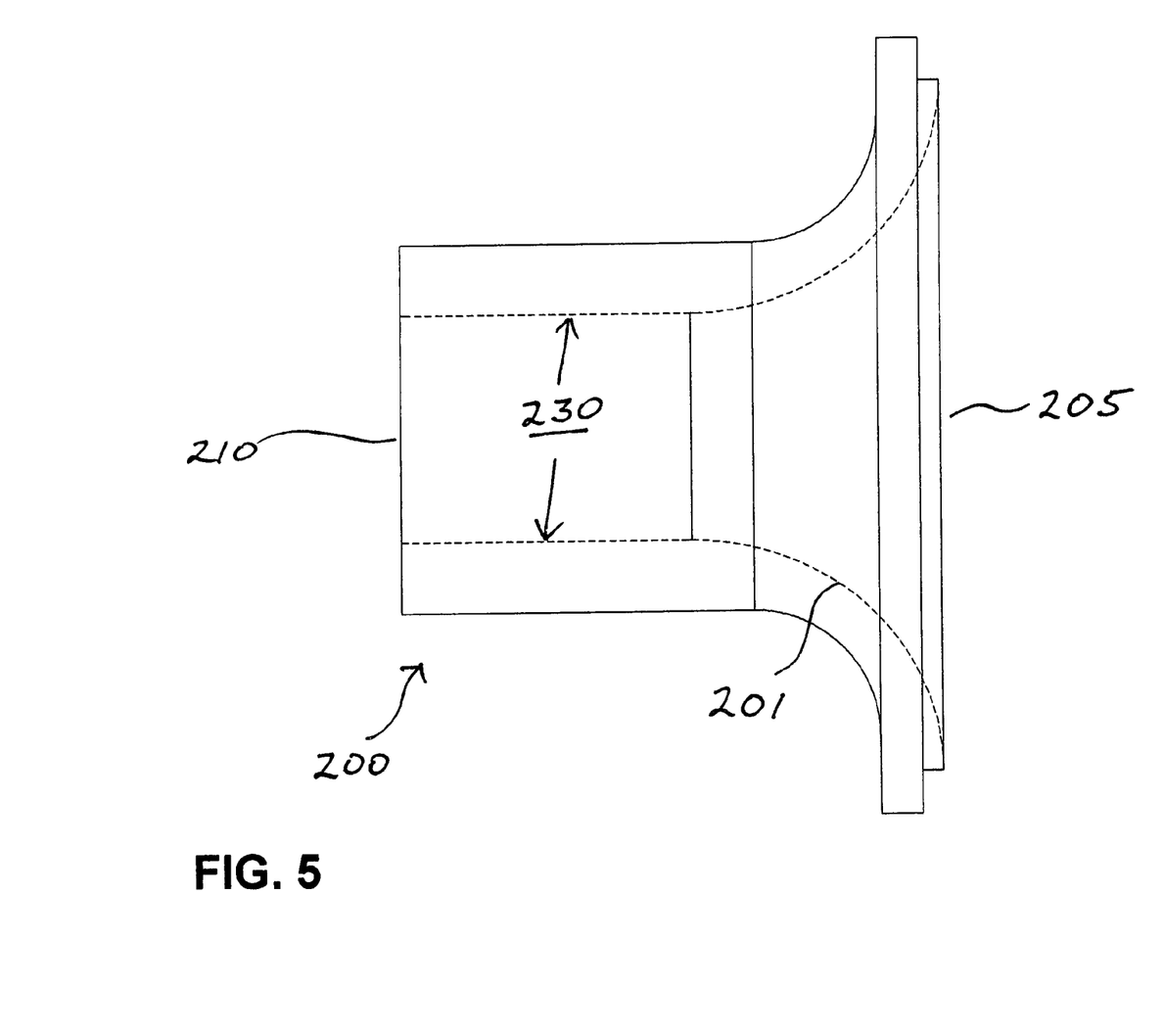
FIG. 5 illustrates a side view of a flow horn having hidden lines visible, in accordance with an embodiment of the present invention.

FIG. 5 illustrates a side view of a flow horn 200 having hidden lines visible, in accordance with an embodiment of the present invention. In an effort to minimize pressure drop through the system, flow horn 200 has a smooth, converging flow transition zone 201 making up a horn fluid inlet 205. Converging flow transition zone 201 ultimately reaches a flow horn through-diameter 230 that is substantially similar to the diameter of spherical profile 112 and radiused surfaces 118 (both part of flow element 100, not shown in this FIG.). A fluid exit 210 can vent to atmosphere, fluidly connect downstream, etc.

Figure 6A:
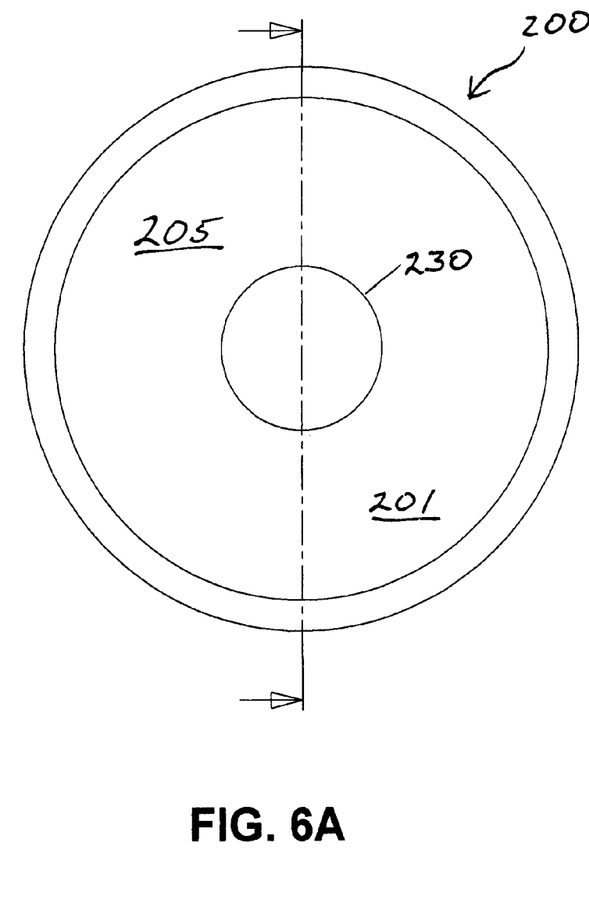
FIG. 6A illustrates a front view of the flow horn from FIG. 5.
Figure 6B:
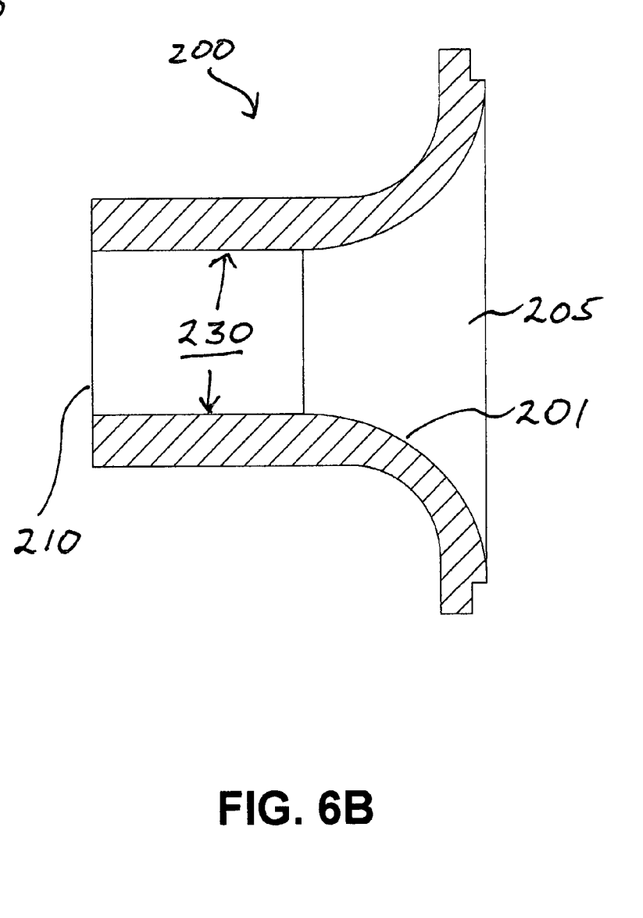
FIG. 6B illustrates a sectional view of the flow horn from section line shown in FIG. 6A.

FIG. 6A illustrates a front view of a flow horn 200 from FIG. 5 and FIG. 6B illustrates a sectional view of flow horn 200 from section line shown in FIG. 6A. Emphasis is made about flow horn transition zone 201 and in the vicinity where transition zone 201 meets flow horn through-diameter 230 to promote laminar fluid flow via a smooth aerodynamic transition.

Figure 7A:
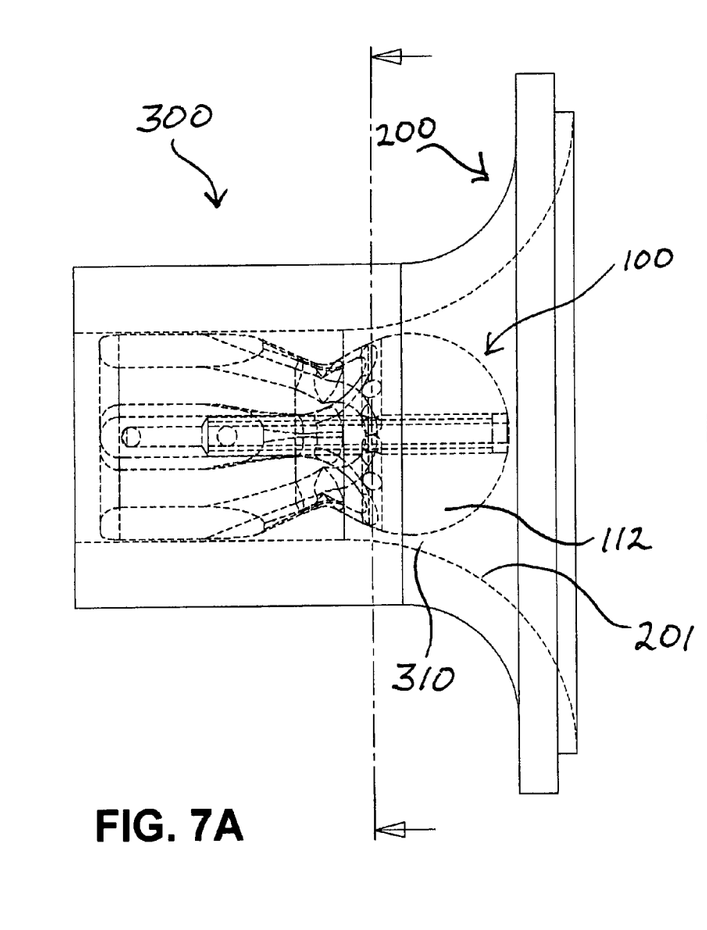
FIG. 7A illustrates a side assembly of a flow element in one possible orientation with a flow horn having hidden lines visible, in accordance with an embodiment of the present invention.

FIG. 7A illustrates a side flow horn assembly 300 comprising flow element 100 and flow horn 200 concentrically aligned about each components major axis. Flow horn assembly 300 illustrates flow element 100 in a general fore and aft orientation with respect to flow horn transitional zone 201 and spherical profile 112. It can be seen that by translating flow element 100 with respect to flow horn 200 about its major axis, allows for variations in a reduced flow area 310.

Figure 7B:
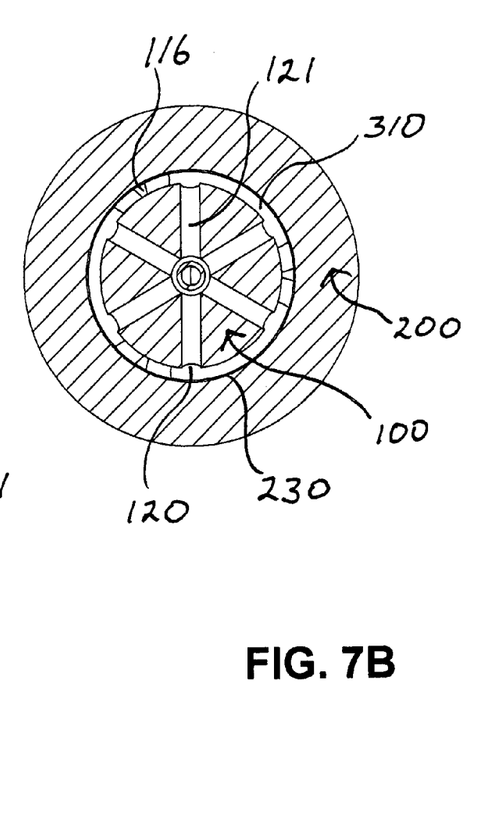
FIG. 7B illustrates a sectional view of flow element and flow horn assembly from section line shown in FIG. 7A.

FIG. 7B illustrates a sectional view of flow horn assembly 300 from section line shown in FIG. 7A. This sectional view illustrates a radial plurality of P2 pressure taps 120 and P2 ducts 121 oriented substantially about or aft of reduced flow area 310. Necked-down region 116 can be seen by looking through reduced flow area 310.

Figure 8A:
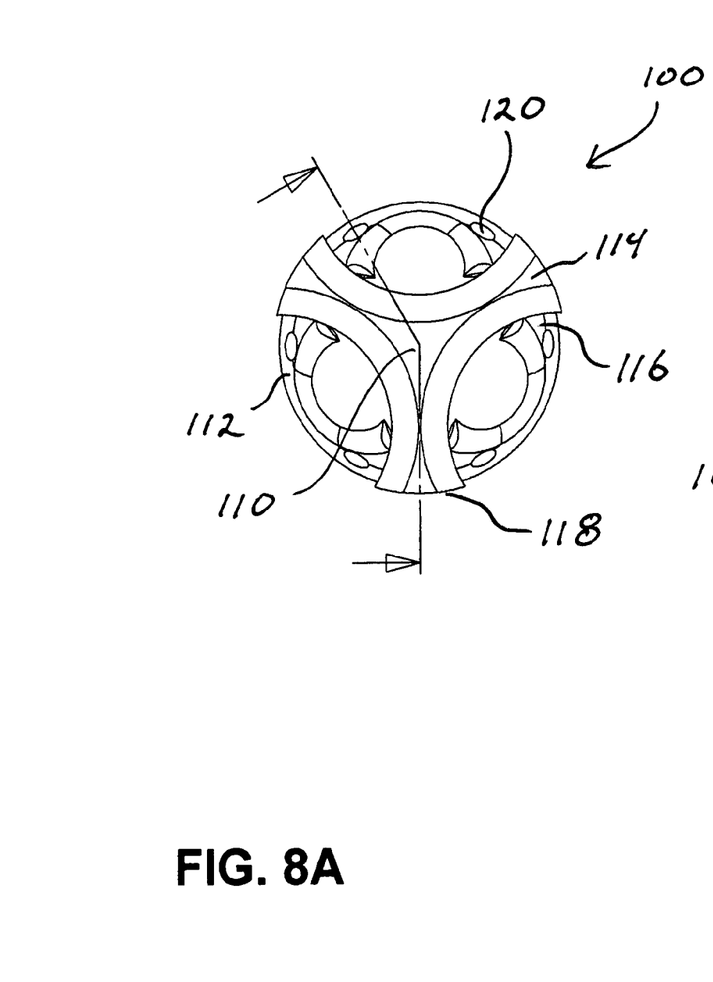
FIG. 8A illustrates a back view of the flow element from FIG. 1.

FIG. 8A illustrates a back view of flow element 100, in accordance with an embodiment of the present invention. Notice that radiused surfaces 118 are slightly larger than spherical profile 112. The minor variations in these two geometries allow flow element 100 to locate within flow horn 200, yet not fully contact, thus cut off fluid flow at the interface of spherical profile 112 and flow horn through-diameter 230 (shown in FIGS. 7A, 7B).

Figure 8B:
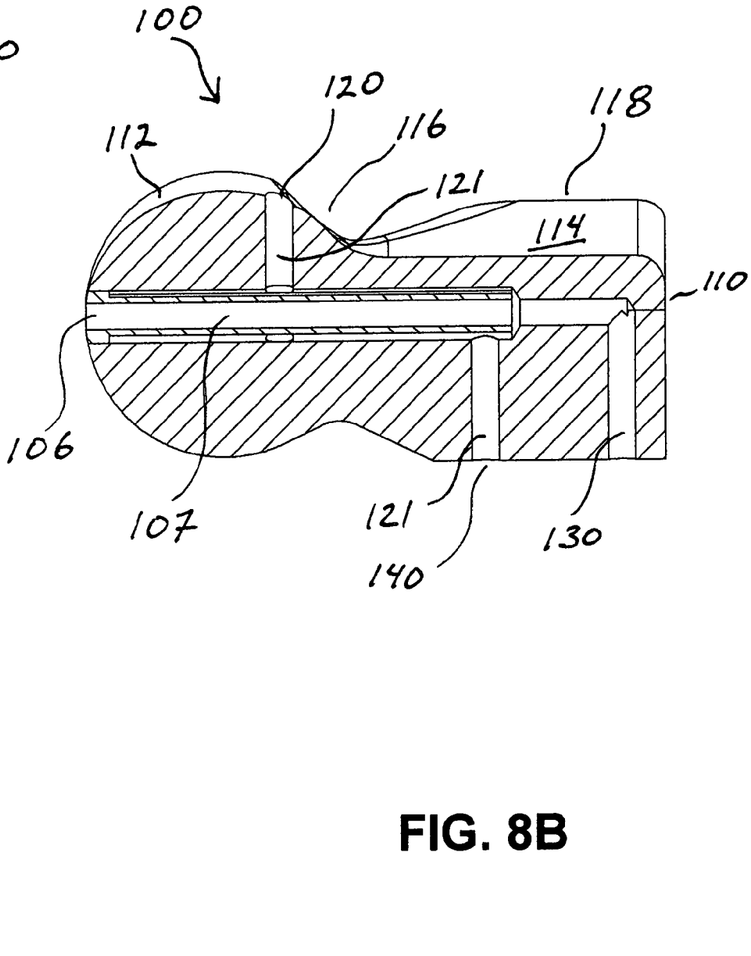
FIG. 8B illustrates a sectional view of the flow element from section line shown in FIG. 8A.

FIG. 8B illustrates a sectional view of flow element 100 from section line shown in FIG. 8A. P1 static pressure tap 106, P1 duct 107, and P1 static pressure pickup 130 are clearly visible in this sectional view. Additionally, one P2 pressure tap 120, P2 duct 121, and P2 pressure pickup 140 are also clearly visible in this sectional view.

Figure 9A:
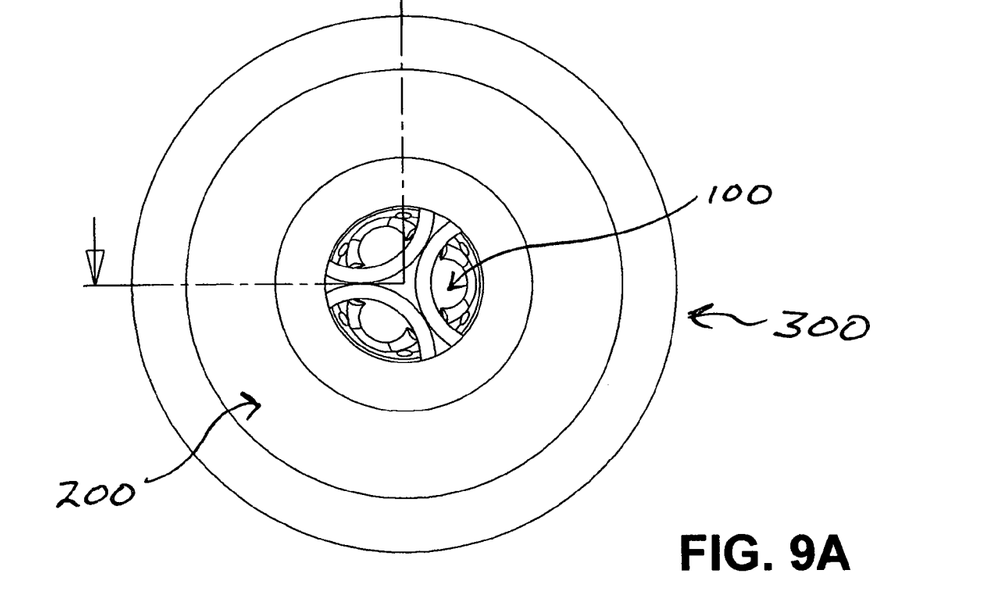
FIG. 9A illustrates a back view of flow element and flow horn assembly from FIG. 7A.
Figure 9B:
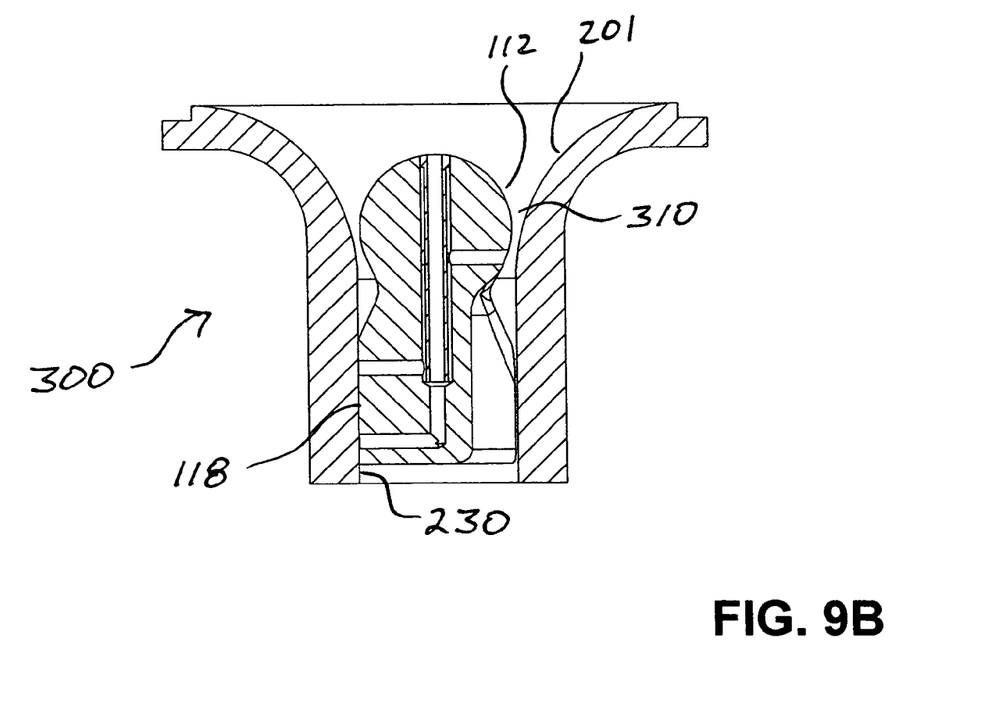
FIG. 9B illustrates a sectional view of flow element and flow horn assembly from section lines shown in FIG. 9A.

FIG. 9A illustrates a back view of flow horn assembly 300 from FIG. 7A and FIG. 9B illustrates a sectional view of flow horn assembly 300 from section lines shown in FIG. 9A. Notice that radiused surfaces 118 are substantially in contact with flow horn through-diameter 230 thus not allowing fluid to flow between the two parts.

Figure 10A:
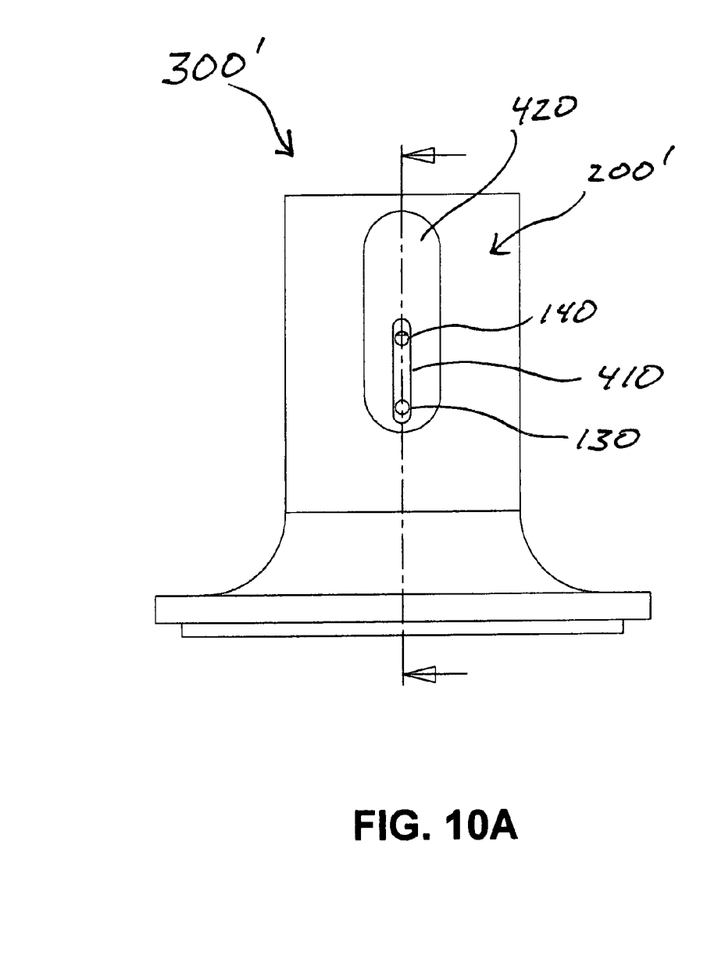
FIG. 10A illustrates a side view of a flow horn assembly showing differential pressure outlet ports and adjusting means, in accordance with embodiments of the present invention.

FIG. 10A illustrates a side view of a flow horn assembly 300' showing differential pressure outlet ports and adjusting means for flow element 100; in accordance with additional embodiments of the present invention. An elongated slot 410 allows for flow element 100 to translate with respect to adjustable flow horn 200' as well as allows P1 static pressure pickup 130 and P2 pressure pickup 140 to be used as mounting and fluid connections. A clearance pocket 420 is illustrated to allow for a flat external surface for example to nut-lock a pressure pickup to the face of clearance pocket 420. Other, more elegant tuning adjusting mechanisms may be integrated into this design without deviating from the spirit of the invention. Possible examples could be a thumb screw, differential lead screw for miniscule adjustments, servo-motor adjust, etc.

Figure 10B:
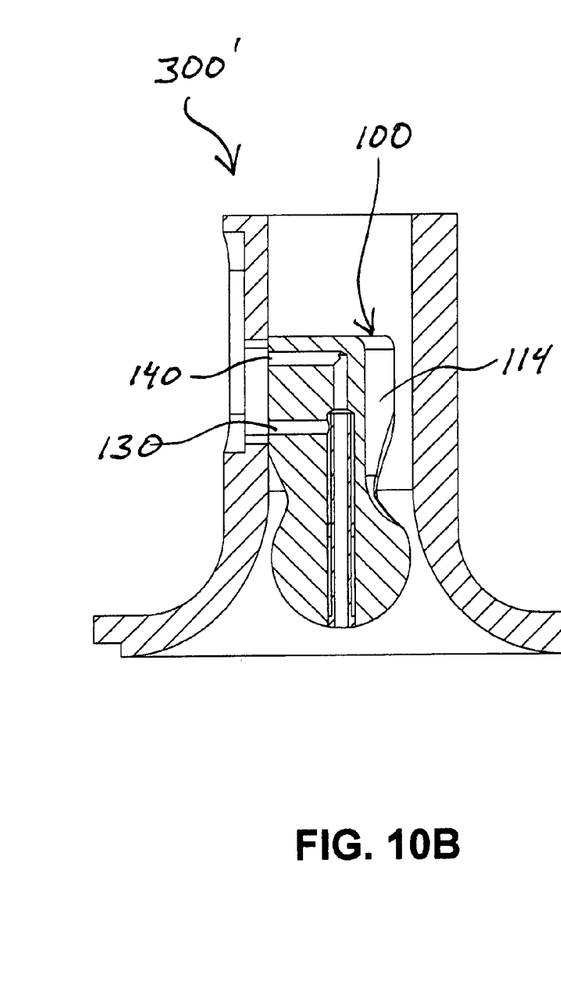
FIG. 10B illustrates a sectional view of flow horn assembly from section line shown in FIG. 10A.

FIG. 10B illustrates a sectional view of flow horn assembly 300' from section line shown in FIG. 10A. Variations in symmetric fins 114 or locations of pressure pickups can allow for increased tuning translation range should this be desired.

Figure 11A:
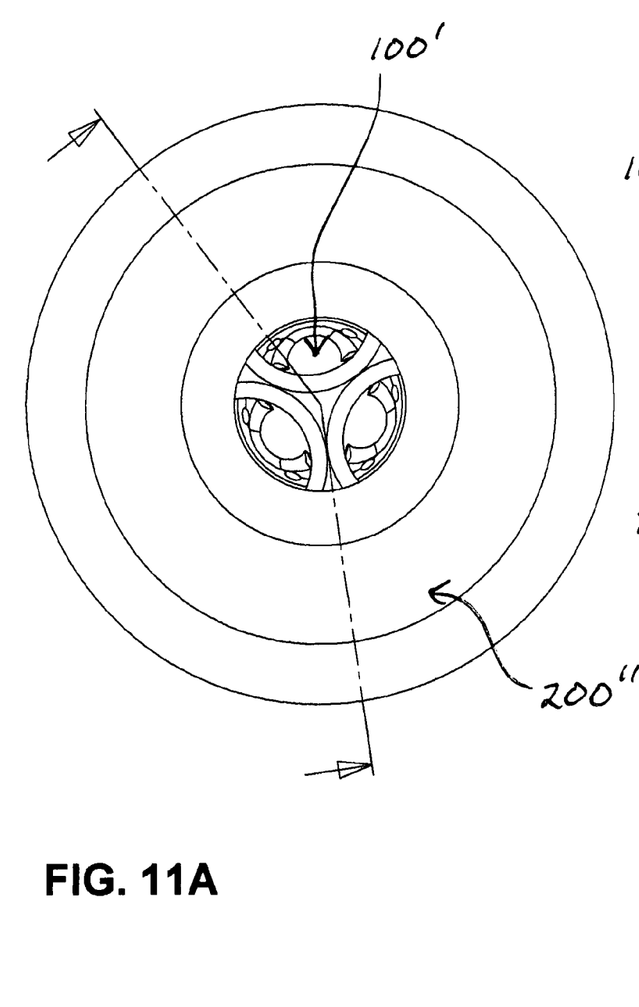
FIG. 11A illustrates a back view of a flow horn assembly containing induction coils, in accordance with embodiments of the present invention.
Figure 11B:
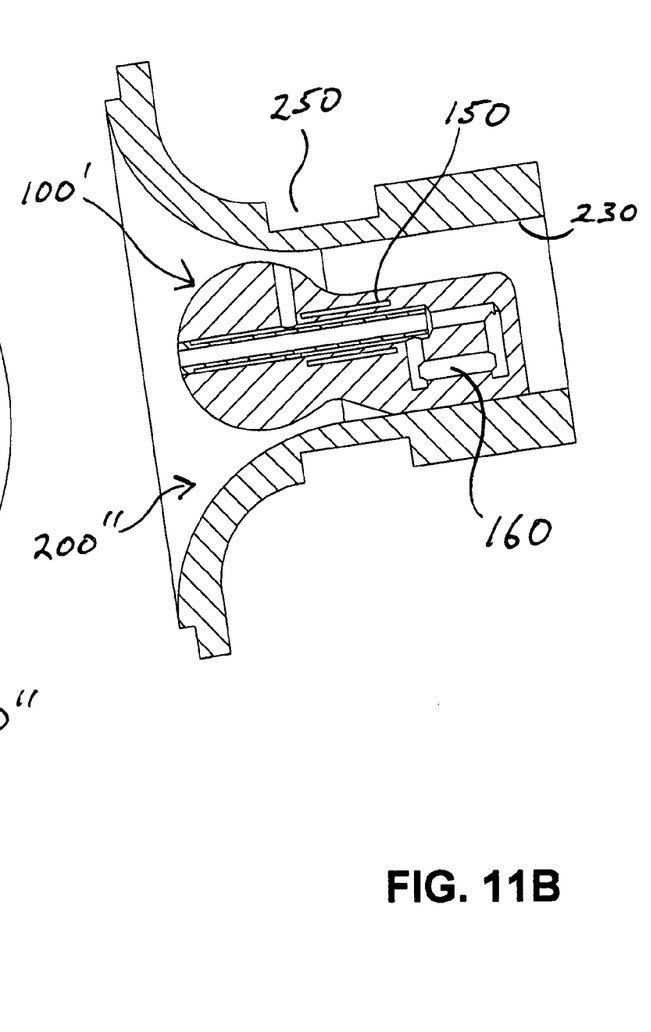
FIG. 11B illustrates a sectional view of flow horn assembly containing induction coils from section line shown in FIG. 11A, thus detailing coil slots and nested pressure transducer and related electronics, in accordance with embodiments of the present invention.

FIG. 11A illustrates a back view of a coil flow horn assembly 200" comprising the use of paired induction coils to transfer signals from coil flow element 100' to an external receiver, in accordance with an embodiment of the present invention. FIG. 11B illustrates a section view defined from FIG. 11A and most clearly exemplifies this embodiment as follows: A flow element coil 150 is wound around coil flow element 100' and wired to power a differential pressure transducer and possibly an A/D transmitter and associated electronics at a fin cavity 160. Preferably, flow element coil 150 is nested within coil flow element 100' such that aerodynamics are consistent and will resist exposure to fluid. Flow element coil 150 can be potted into place, over-molded with a secondary molding operation, epoxied, etc. In this embodiment, all power is supplied to the differential pressure transducer by a coupled coil arrangement. A flow horn coil 250 is wound around coil flow horn 200" and provides the power to flow element coil 150. Coil flow element 100' can be retained in position by a press-fit between flow horn through-diameter 230 and radiused surfaces 118 or can equally be retained in position by an external adjusting mechanism as was discussed with FIGS. 10A and 10B. Additionally, a powerful flow horn coil 250 can excite the internal electronics in flow element 100' as well as magnetically couple with magnets strategically located within the body of flow element 100' to retain into place. Of course, a fore and aft adjustment means would be incorporated into this magnetically coupled system, thus creating a truly floating flow element within a fluid flow stream.

Therefore, after teaching the above embodiments, we claim:

1. An in stream flow meter system comprising:
   a) a flow element;
      said flow element having an aerodynamic frontal profile;
      said flow element frontal profile smoothly transitioning into three or more fins;
      said fins having an outer-most radiused surface that approximates the maximum diameter of said flow element frontal profile; wherein
      a necked-down region exists at the intersection of said substantially spherical frontal profile and said fins;
      said flow element having a P1 static pressure tap concentrically situated at the front most portion of said frontal profile;
      said P1 static pressure tap fluidly connecting via a P1 duct to a P1 static pressure pickup;
      said flow element having one or more P2 pressure tap(s) situated within said necked-down region;
      said P2 pressure tap(s) fluidly connecting via a P2 duct to a P2 pressure pickup;
   b) said in stream flow meter system additionally comprising:
      a generally conical shaped flow horn that converges in a flow transitional zone to a flow horn through-diameter that has a constant or substantially constant diameter;
      said flow element axially aligned with said flow horn central axis and said flow element capable of operably functioning when situated within said flow horn when said P2 pressure tap(s) are located within said flow horn through-diameter or located about said flow transitional zone;
      the outer-most radiused surface on said fins preferably dimensionally approximating said flow horn through-diameter such that all fluid passing over said flow element will be directed between said fins;
      said P1 static pressure pickup and P2 pressure pickup fluidly joined to a differential pressure transducer; wherein
      pressure differentials can be associated with a fluid flow rate.

2. Said flow element defined in claim 1 maintained in position with respect to said flow horn via an interference press-fit between the outer-most radiused surface on said fins and said flow horn through-diameter.

3. Said flow element defined in claim 1 maintained in position with respect to said flow horn via an external mechanical fastening means between the outer-most radiused surface on said fin(s), protruding through the wall of said flow horn to the outside of said flow horn.

4. The external mechanical fastening means from claim 3 capable of allowing axial translation of said flow element within said flow horn.

5. The aerodynamic frontal profile of said flow element from claim 1 comprising a spherical shape continuing to at least the leading edge of said P2 pressure tap(s).

6. The aerodynamic frontal profile of said flow element from claim 1 comprising a conical profile.

7. The aerodynamic frontal profile of said flow element from claim 1 comprising a parabolic profile.

8. Said differential pressure transducer defined in claim 1 located outside said flow horn.

9. Said mechanical fastening means from claim 3 comprising the ability to additionally conduit said P1 static pressure and P2 pressure to said differential pressure transducer.

10. Said differential pressure transducer defined in claim 1 located within said flow element;
    said flow element additionally comprising an internal induction coil;
    said internal induction coil operatively wired to power said differential pressure transducer, a wireless signal transmitter, and associated electronics to complete a functional signal transmitting system;
    said flow horn from claim 1 comprising an induction coil capable of powering said functional signal transmitting system.

11. Said differential pressure transducer defined in claim 1 located within said flow element;
    said flow element additionally comprising an internal battery power supply capable of powering said differential pressure transducer, a wireless signal transmitter, and associated electronics to complete a functional signal transmitting system.

12. A method of measuring a fluid flow rate comprising:
    inserting a flow element into a fluid free stream;
    said flow element having an aerodynamic frontal profile smoothly transitioning into three or more fins;
    said fins having an outer-most surface that approximates the maximum cross-sectional area of said flow element profile; wherein
    a necked-down region exists at the intersection of said aerodynamic frontal profile and said fins;
    said flow element having a P1 static pressure tap concentrically situated at the front most portion of said frontal profile;
    said P1 static pressure tap fluidly connecting via a P1 duct to a P1 static pressure pickup;
    said flow element having one or more P2 pressure tap(s) situated within said necked-down region;
    said P2 pressure tap(s) fluidly connecting via a P2 duct to a P2 pressure pickup;

said method of measuring a fluid flow rate additionally comprising a generally conical shaped flow horn that converges in a flow transitional zone to a flow horn through-diameter that has a constant or substantially constant cross-sectional area;

said flow element axially aligned with said flow horn central axis and said flow element capable of operably functioning when situated within said flow horn when said P2 pressure tap(s) are located within said flow horn through-diameter or located about said flow transitional zone;

the outer-most surface of said fins preferably dimensionally approximating said flow horn geometries at contact points between said flow element and said flow horn; such that all fluid passing over said flow element will be directed between said fins;

said P1 static pressure pickup and P2 pressure pickup fluidly joined to a differential pressure transducer; wherein pressure differentials can be associated with a fluid flow rate.

* * * * *